US011919303B2

(12) United States Patent
Ha et al.

(10) Patent No.: US 11,919,303 B2
(45) Date of Patent: Mar. 5, 2024

(54) JETTING DRIVER AND SUBSTRATE TREATMENT APPARATUS AND METHOD

(71) Applicant: SEMES CO., LTD., Chungcheongnam-do (KR)

(72) Inventors: Sang Min Ha, Gyeonggi-do (KR); Sang Hyun Son, Busan (KR); Young Joo Seo, Gyeonggi-do (KR); Hyeong Jun Cho, Seoul (KR); Jae Hong Kim, Chungcheongnam-do (KR)

(73) Assignee: SEMES CO., LTD., Cheonan-si (KR)

( * ) Notice: Subject to any disclaimer, the term of this patent is extended or adjusted under 35 U.S.C. 154(b) by 125 days.

(21) Appl. No.: 17/734,080

(22) Filed: May 1, 2022

(65) Prior Publication Data

US 2023/0063938 A1 Mar. 2, 2023

(30) Foreign Application Priority Data

Sep. 1, 2021 (KR) ........................ 10-2021-0116605

(51) Int. Cl.
*B41J 2/045* (2006.01)
*B41J 2/07* (2006.01)
*B41J 2/125* (2006.01)

(52) U.S. Cl.
CPC ....... *B41J 2/04581* (2013.01); *B41J 2/04518* (2013.01); *B41J 2/072* (2013.01); *B41J 2/125* (2013.01)

(58) Field of Classification Search
CPC .... B41J 2/04581; B41J 2/04518; B41J 2/072; B41J 2/125; B41J 2/04541; B41J 2/07; B41J 29/38; B41J 2/04501
See application file for complete search history.

(56) References Cited

U.S. PATENT DOCUMENTS

2019/0392271 A1* 12/2019 Knierim ............... B41J 2/04588

FOREIGN PATENT DOCUMENTS

| | | | |
|---|---|---|---|
| CN | 100401737 C * | 7/2008 | ......... H04N 1/00278 |
| KR | 10-0923322 | 10/2009 | |
| KR | 10-1310759 | 9/2013 | |
| KR | 10-2020-0001480 | 1/2020 | |

OTHER PUBLICATIONS

Machine Translation of (CN 100401737 C) "The Image Supply Device And Control Method Thereof, And Printing System", Jul. 9, 2008, Whole Document (Year: 2008).*

* cited by examiner

*Primary Examiner* — Lisa Solomon
(74) *Attorney, Agent, or Firm* — Ladas & Parry, LLP

(57) ABSTRACT

Provided is a jetting driver that can be used for various types of heads with minimal changes. The jetting driver includes: an image board receiving raw image data and generating image data by transforming the raw image data into a form suitable for a type of heads used; and an interface board physically separated from the image board, receiving the image data, and transmitting the image data to the heads through a plurality of channels.

19 Claims, 8 Drawing Sheets

JETTING DRIVER AND SUBSTRATE TREATMENT APPARATUS AND METHOD

CROSS-REFERENCE TO RELATED APPLICATION

This application claims the benefit of Korean Patent Application No. 10-2021-0116605, filed on Sep. 1, 2021, in the Korean Intellectual Property Office, the disclosure of which is incorporated herein in its entirety by reference.

BACKGROUND

1. Technical Field

The present disclosure relates to a jetting driver and a substrate treatment apparatus and method.

2. Description of the Related Art

When a display device is manufactured, an inkjet device may be used. A jetting driver of the inkjet device is used to drive a head to eject or pattern a chemical onto a glass substrate.

Meanwhile, various types of heads may be used according to the chemical used in the inkjet device or the required precision. However, whenever the head is replaced, the jetting driver for driving the head also needs to be changed. Such a change requires a lot of time and resources.

SUMMARY

Aspects of the present disclosure provide a jetting driver that can be used for various types of heads with minimal changes.

Aspects of the present disclosure also provide a substrate treatment apparatus using the jetting driver.

Aspects of the present disclosure also provide a substrate treatment method using the jetting driver.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the present disclosure, there is provided a jetting driver an image board receiving raw image data and generating image data by transforming the raw image data into a form suitable for a type of heads used, and an interface board physically separated from the image board, receiving the image data, and transmitting the image data to the heads through a plurality of channels.

According to another aspect of the present disclosure, there is provided a A substrate treatment apparatus a pattern computer providing raw image data and setting data; and a jetting driver controlling a plurality of heads based on the raw image data and the setting data, wherein the jetting driver comprises an image board and an interface board physically separated from each other, wherein the image board comprises an FPGA generating image data by transforming the raw image data into a form suitable for a type of the heads used, wherein the interface board comprises, a plurality of differential line transmitters for communicating with the heads, an image controller receiving the image data and providing the image data to the differential line transmitters, a heater controller providing a heater control signal for controlling a heater installed in each of the heads to the differential line transmitters and a voltage controller providing a voltage control signal for specifying a voltage level to be used by the heads to the differential line transmitters According to another aspect of the present disclosure, there is provided a substrate treatment method comprising providing a jetting driver comprising an image board and an interface board physically separated from each other, wherein the image board comprises an FPGA, receiving first raw image data and generating first image data by transforming the first raw image data into a form suitable for a plurality of first heads of a first type by using the image board and receiving the first image data and transmitting the first image data to the first heads through a plurality of channels, replacing the first heads with a plurality of second heads of a second type different from the first type, reprogramming the FPGA of the image board to suit the second type; and receiving second raw image data and generating second image data by transforming the second raw image data into a form suitable for the second heads of the second type by using the image board and receiving the second image data and transmitting the second image data to the second heads through a plurality of channels by using the interface board.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
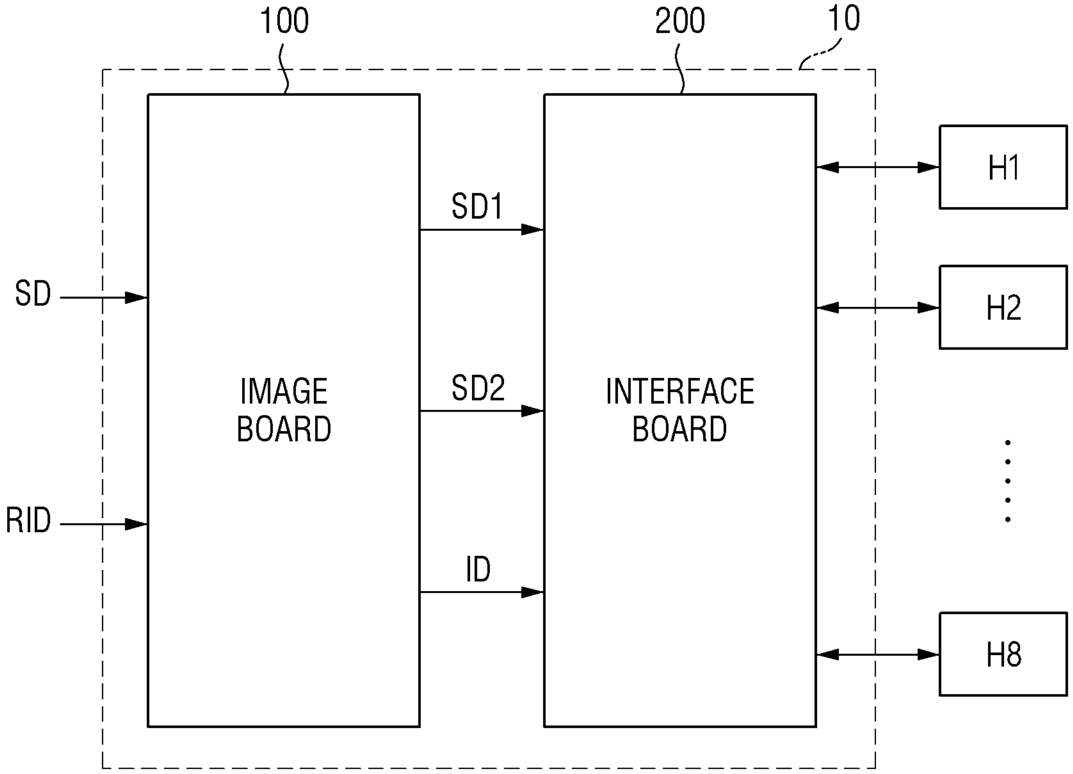
FIG. 1 is a block diagram of a jetting driver according to embodiments of the present disclosure.

Hereinafter, exemplary embodiments of the present disclosure will be described in greater detail with reference to the attached drawings. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like reference numerals refer to like elements throughout the specification.

Spatially relative terms, such as "below," "beneath," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" or "beneath" can encompass both an orientation of above and below. The device may be otherwise oriented and the spatially relative descriptors used herein interpreted accordingly.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of the present disclosure.

Hereinafter, embodiments of the present disclosure will be described in detail with reference to the attached drawings. In the following description with reference to the attached drawings, like or corresponding elements will be indicated by like reference numerals, and a redundant description thereof will be omitted.

Figure 2:
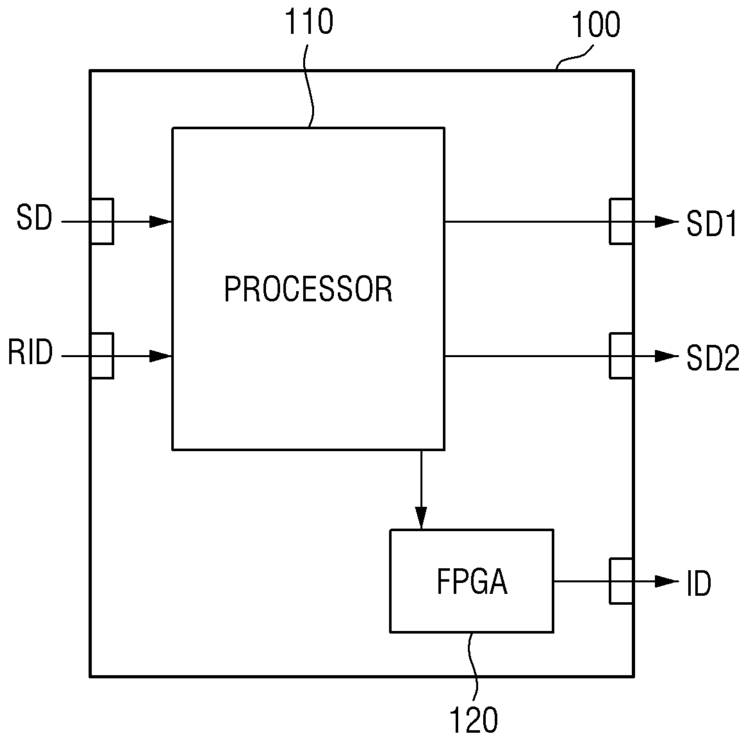
FIG. 2 is a block diagram of an image board of FIG. 1.
Figure 3:
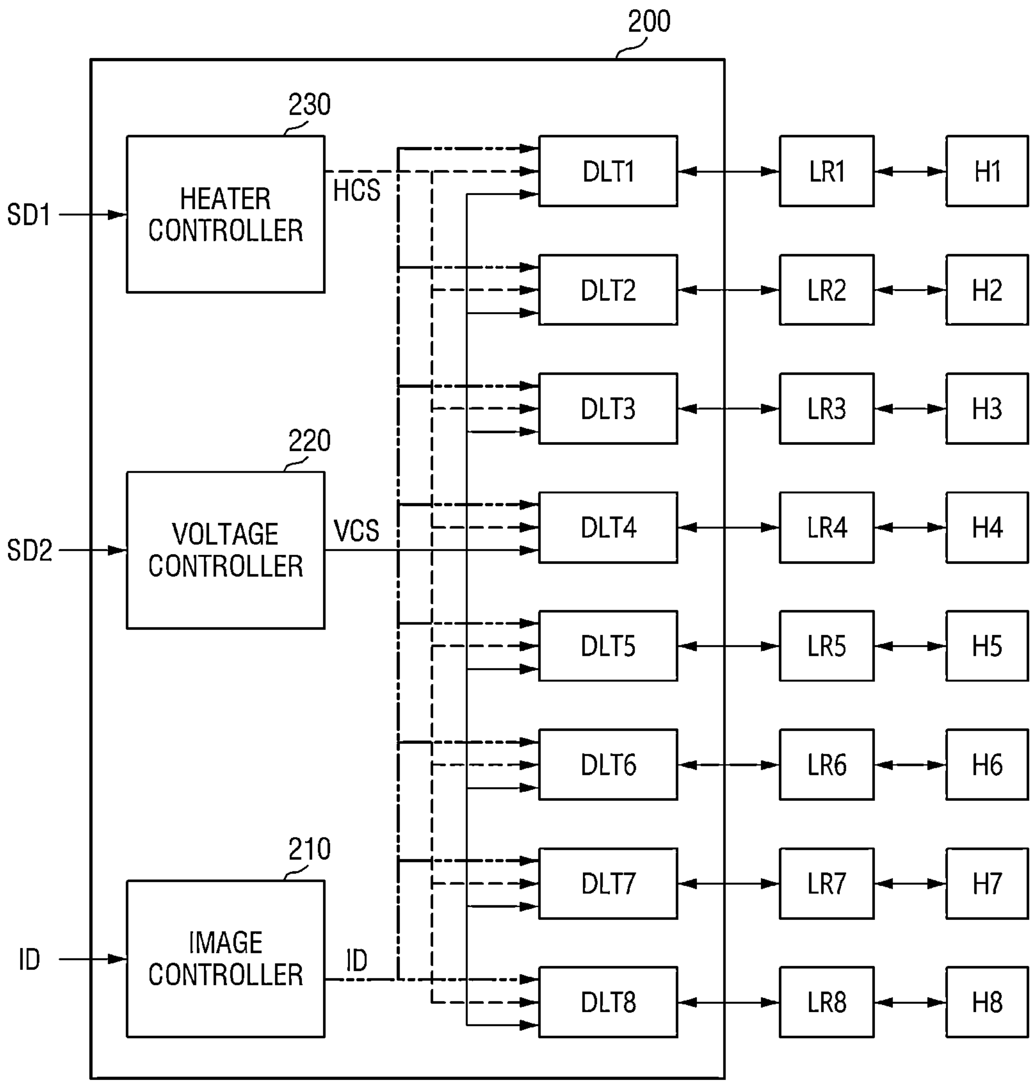
FIG. 3 is a block diagram of an interface board of FIG. 1.
Figure 4:
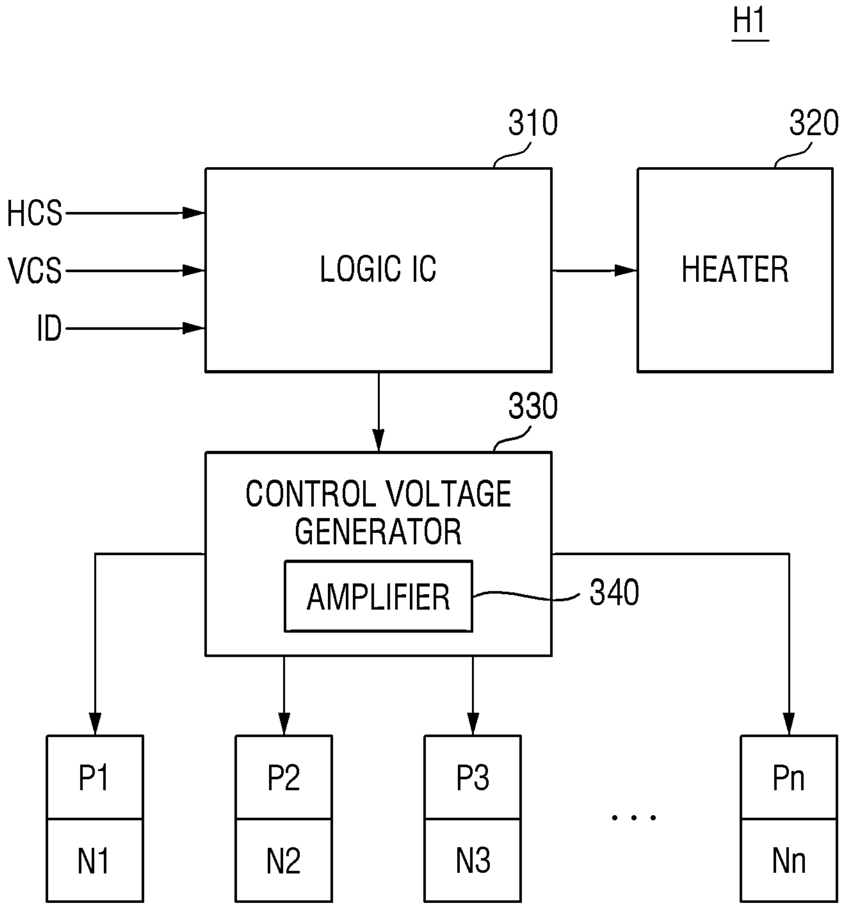
FIG. 4 is a block diagram illustrating the exemplary structure of a head illustrated in FIG. 1.

FIG. 1 is a block diagram of a jetting driver 10 according to embodiments of the present disclosure. FIG. 2 is a block diagram of an image board 100 of FIG. 1. FIG. 3 is a block diagram of an interface board 200 of FIG. 1. FIG. 4 is a block diagram illustrating the exemplary structure of a head illustrated in FIG. 1.

Referring first to FIG. 1, the jetting driver 10 according to the embodiments of the present disclosure includes the image board 100 and the interface board 200.

The image board 100 receives setting data SD and raw image data RID.

The setting data SD may be information related to basic settings required for the operation of heads H1 through H8. For example, the setting data SD may include information about a waveform of a voltage for controlling piezo elements installed in the heads H1 through H8 (e.g., a rising time, a falling time, a high level holding time, a low level holding time, etc.), information about a voltage level used (e.g., 3V, 5V, 10V, 15V, etc.), and a target temperature that must be maintained by the heads H1 through H8.

By using the setting data SD, the image board 100 generates a first setting signal SD1 for control related to the temperature of the heads H1 through H8 and a second setting signal SD2 for control related to a voltage to be used in the heads H1 through H8.

The raw image data RID may be information related to an image that the heads H1 through H8 should eject onto a substrate. That is, the raw image data RID may be information about in which form (e.g., a square, a triangle, a circle, a zigzag, etc.) the heads H1 through H8 should eject a chemical onto the substrate.

The image board 100 receives the raw image data RID and generates image data ID by transforming the raw image data RID into a form suitable for the type of heads used. As for the transformation into "the form suitable for the type of the heads," an interface may be different if a maker is different and, even if the maker is the same, may be different depending on the type of the heads. That is, since the interface is not standardized, a transmission sequence may be different depending on the maker/type of the heads. Therefore, the image board 100 generates the image data ID in a form suitable for a head maker/type (e.g., according to a transmission sequence determined by a head maker).

Here, referring to FIG. 2, the image board 100 includes input terminals to which the setting data SD and the raw image data RID are provided and output terminals which output the first setting signal SD1, the second setting signal SD2, and the image data ID. In addition, the image board 100 includes a processor 110 and a field programmable gate array (FPGA) 120.

The processor 110 may generate and provide the first setting signal SD1 and the second setting signal SD2 by using the setting data SD as described above. In addition, the processor 110 may exchange data with a pattern computer 60 (see FIG. 5) that provides the raw image data RID and the setting data SD, an operating computer 50 (see FIG. 5), and an encoder manager 52 (see FIG. 5).

The FPGA 120 is a semiconductor device including a designable logic device and/or a programmable internal circuit. Even after the FPGA 120 is manufactured, it can be reprogrammed in the field by a user (or consumer, designer). Such field programming allows the FPGA 120 to perform various logic functions. Therefore, when heads are replaced/changed, a user may reprogram the FPGA 120 according to the type of the replaced heads (i.e., so that the FPGA 120 can perform an operation suitable for the replaced heads). The FPGA 120 generates the image data ID by transforming the raw image data RID into a form suitable for the type of the replaced heads. Therefore, since the FPGA 120 can be reprogrammed and used even if the heads are replaced/changed, there is no need to change the image board 100.

Referring back to FIG. 1, the interface board 200 performs an interfacing operation between the image board 100 and the heads H1 through H8.

For example, the interface board 200 receives the first setting signal SD1, the second setting signal SD2, the image data ID, etc. from the image board 100 and provides them to the heads H1 through H8. In addition, the interface board 200 may receive state information of the heads H1 through H8 (e.g., temperature information of the heads H1 through H8) from the heads H1 through H8 and may control the heads H1 through H8 in response to the state information or provide the state information to the image board 100. The state information of the heads H1 through H8 may be transmitted to the operating computer 50 (see FIG. 5) through the image board 100.

In addition, the image board 100 and the interface board 200 are physically separated from each other. The image board 100 and the interface board 200 may be connected by a board-to-board connector and may communicate with each other through the board-to-board connector.

Here, referring to FIG. 3, the interface board 200 may include an image controller 210, a voltage controller 220, a heater controller 230, and a plurality of differential line transmitters DLT1 through DLT8.

The image controller 210 transmits the image data ID received from the FPGA 120 to the heads H1 through H8 through a plurality of channels. Although only eight channels are illustrated in the drawing, the present disclosure is not limited thereto. The number of channels can be changed to 2, 4, 16, 64, etc.

The transmitted image data ID is transformed into differential signals by the differential line transmitters DLT1 through DLT8 and then transmitted to the heads H1 through H8. The image data ID is transformed into the differential signals to minimize the influence of interference that may occur while the image data ID is being transmitted to the heads H1 through H8 in the jetting driver 10.

In addition, the heater controller 230 receives the first setting signal SD1 and provides a heater control signal HCS for controlling a heater 320 (see FIG. 4) installed in each of the heads H1 through H8 so that the heads H1 through H8 can reach a target temperature. As illustrated, the heater control signal HCS is transmitted to the heads H1 through H8 through a plurality of channels.

The voltage controller 220 may receive the second setting signal SD2 and provide a voltage control signal VCS that specifies a plurality of voltage levels to be used by the heads H1 through H8. As illustrated, the voltage control signal VCS is transmitted to the heads H1 through H8 through a plurality of channels.

The differential line transmitters DLT1 through DLT8 provide the image data ID, the heater control signal HCS, and the voltage control signal VCS in the form of differential signals. Therefore, a plurality of line receivers receive differential signals from corresponding differential line transmitters DLT1 through DLT8, convert the differential signals into single-end signals, and provide the single-end signals to corresponding heads H1 through H8.

The heater controller 230, the voltage controller 220, and the image controller 210 may be implemented as one or several micro control units (MCUs).

Here, referring to FIG. 4, a head (e.g., H1) includes a logic integrated circuit (IC) 310, the heater 320, a control voltage generator 330, an amplifier 340, a plurality of piezo elements P1 through Pn (where n is natural number), and a plurality of nozzles N1 through Nn (where n is a natural number).

The logic IC 310 may receive the image data ID, the heater control signal HCS and the voltage control signal VCS and control a plurality of functional blocks (e.g., 320, 330, P1 through Pn, etc.) in the head H1.

The logic IC 310 allows the temperature of the heater 320 to reach a target temperature according to an instruction of the heater control signal HCS. The viscosity of a chemical is changed according to the temperature of the heater 320. When the viscosity of the chemical is changed, a preset amount of the chemical is not ejected even if a preset voltage is applied to the piezo elements P1 through Pn. Therefore, it is necessary to continuously manage the temperature of the heater 320.

The logic IC 310 controls the control voltage generator 330 to operate at right timing according to a plurality of voltage levels and voltage waveforms specified by the voltage control signal VCS.

The amplifier 340 is installed inside the control voltage generator 330. Even if not provided with a high level voltage through a power line, the amplifier 340 may increase a low level voltage to a preset voltage level.

The piezo elements P1 through Pn receive a control voltage from the control voltage generator 330 and control the nozzles N1 through Nn to eject a chemical. Although not illustrated separately, the nozzles N1 through Nn are connected to a reservoir that stores a chemical, receive the chemical from the reservoir, and eject the chemical according to the control voltage.

In summary, the jetting driver 10 according to the embodiments of the present disclosure includes the image board 100 and the interface board 200 physically separated from each other. Even if the heads H1 through H8 to be used are changed/replaced, the FPGA 120 (see FIG. 2) of the image board 100 can be reprogrammed and used. Therefore, there is no need to replace the entire jetting driver 10. If necessary, only the interface board 200 can be replaced, or the interface board 200 can be reused with minimal modifications.

Figure 5:
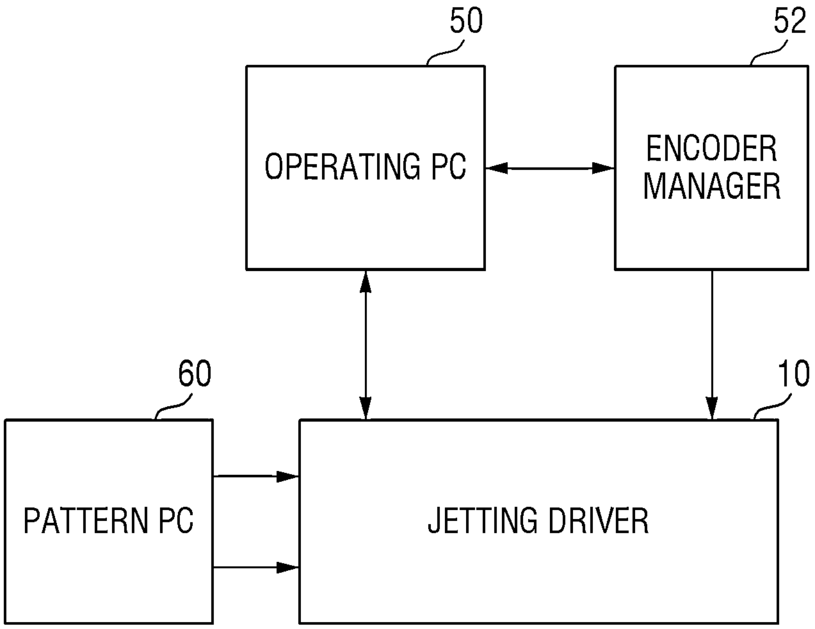
FIGS. 5 and 6 are diagrams for explaining a substrate treatment apparatus according to embodiments of the present disclosure.
Figure 6:
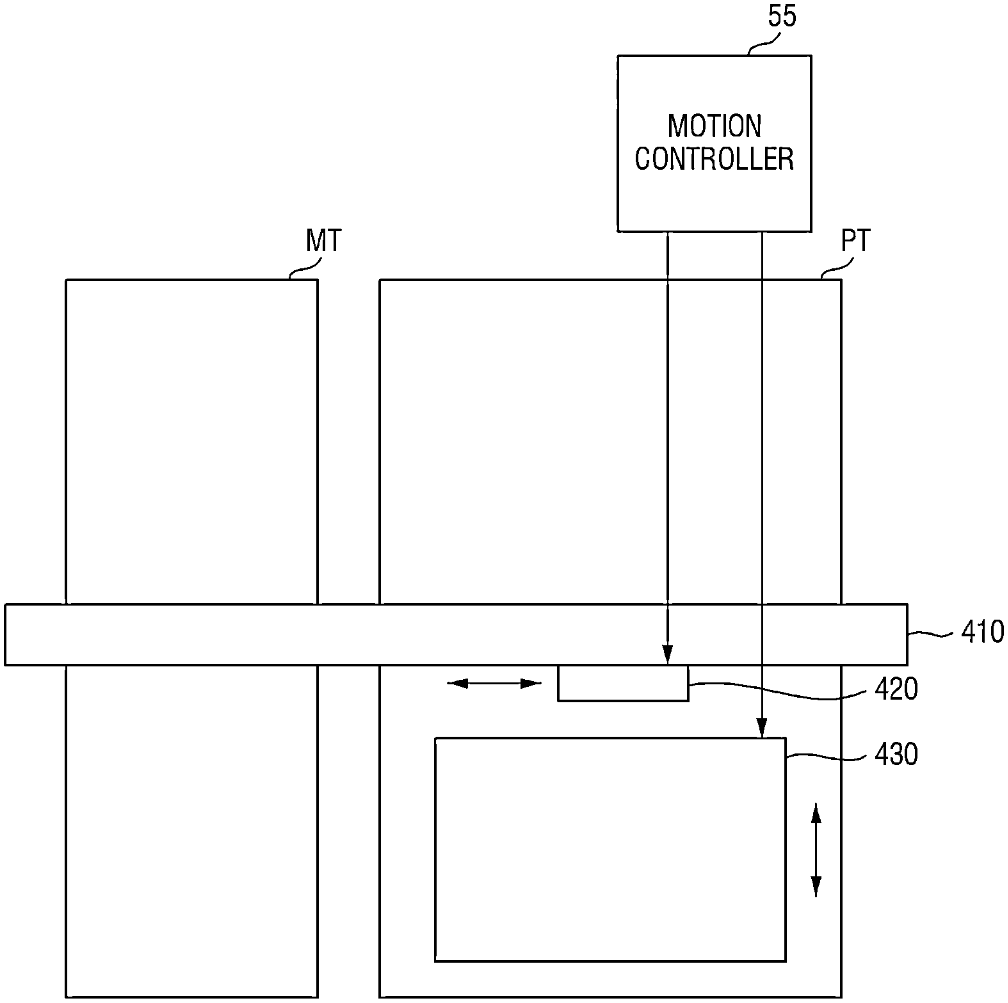

FIGS. 5 and 6 are diagrams for explaining a substrate treatment apparatus according to embodiments of the present disclosure. The following description will focus on differences from elements and features described above with reference to FIGS. 1 through 4.

First, referring to FIGS. 5 and 6, the substrate treatment apparatus may include a jetting driver 10, an operating computer 50, a pattern computer 60, and an encoder manager 52.

The pattern computer 60 provides setting data SD and raw image data RID to the jetting driver 10. As described above, the setting data SD may be information related to basic settings necessary for the operation of heads H1 through H8 and may be information about a voltage waveform, a voltage level, and a target temperature that must be maintained by the heads H1 through H8. The raw image data RID is information related to an image that the heads H1 through H8 should eject onto a substrate.

The operating computer 50 may communicate with a motion controller 55 of FIG. 6 and may control equipment illustrated in FIG. 6 through the motion controller 55.

The equipment includes a process area PT and a maintenance area MT. A gantry 410 is positioned above the process area PT and the maintenance area MT to cross the process area PT and the maintenance area MT. A plurality of heads 420 may be installed on the gantry 410 and may move along a direction (a horizontal direction in the drawing) in which the gantry 410 extends. That is, the heads 420 may eject a chemical in both the process area PT and the maintenance area MT.

A stage 430 may be positioned above the process area PT and may move in a longitudinal direction (a vertical direction in the drawing) of the process area PT. A glass substrate is placed on the stage 430, and the heads 420 eject a chemical onto the glass substrate while the stage 430 under the gantry 410 moves multiple times in the vertical direction.

The maintenance area MT is an area for maintaining the heads H1 through H8 or checking the state of the heads H1 through H8. Although not illustrated separately, a test film rotating in a roll-to-roll manner is placed in the maintenance area MT, and the heads 420 eject a chemical onto the test film. Thus, it is possible to check the amount, density, etc. of the chemical ejected from each nozzle of the heads 420 or possible to check whether a nozzle is clogged or whether the chemical is ejected in an amount far greater than a preset amount.

Here, referring to FIG. 5, the encoder manager 52 provides a trigger signal to a plurality of the jetting drivers 10 using an encoder signal indicating the position of the stage 430. As described above, while the stage 430 moves up and down, the heads H1 through H8 eject a chemical. Therefore, only when the exact position of the stage 430 is identified can the heads H1 through H8 eject the chemical to a correct position. The jetting driver 10 controls a chemical ejection start point of the heads H1 through H8 based on the trigger signal.

The operating computer 50 may receive the trigger signal from the encoder manager 52, compare the position of the stage 430 with the trigger signal, and check whether the trigger signal is normal.

The jetting driver 10 (i.e., an image board 100) is connected to the operating computer 50 through EtherCAT that is an industrial network. The image board 100 provides the state of the jetting driver 10 to the operating computer 50 so that the operating computer 50 can monitor the jetting driver 10. Since the jetting driver 10 is connected to the operating computer 50 through EtherCAT, the operating computer 50 can quickly identify the state of the jetting driver 10 in real time.

In addition, the operating computer 50 may receive state information of the heads H1 through H8 through an interface board 200 and the image board 100 and identify the state of the heads H1 through H8. Based on the identified state of the heads H1 through H8, the operating computer 50 may request the pattern computer 60 to change the setting data SD. For example, if the operating computer 50 considers that the actual temperature of the heads H1 through H8 is high, it may request the pattern computer 60 to further lower the target temperature. The pattern computer 60 may modify the target temperature included in the setting data SD at the request of the operating computer 50.

In addition, the jetting driver 10 and the encoder manager 52 may be connected through EtherCAT. The encoder manager 52 and the operating computer 50 may also be connected through EtherCAT. The operating computer 50 may quickly check the trigger signal provided by the encoder manager 52 in real time. Therefore, the operating computer 50 may have a monitoring function of detecting, in advance, states such as non-ejection and pattern shifting that may occur during mass production.

Figure 7:
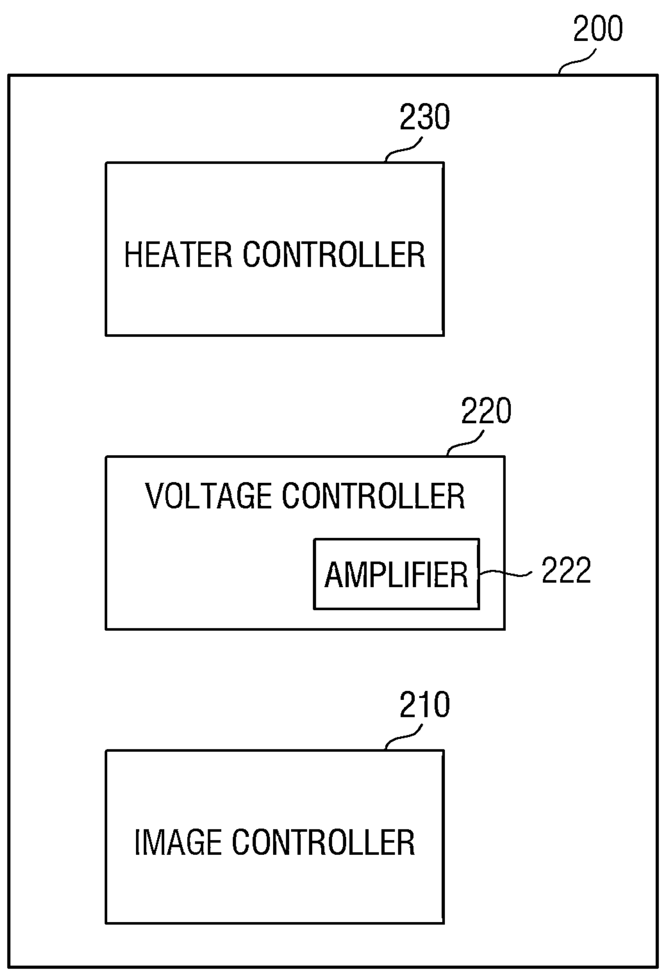
FIG. 7 is a block diagram of a jetting driver according to an embodiment of the present disclosure.

FIG. 7 is a block diagram of a jetting driver 10 according to an embodiment of the present disclosure. For ease of description, elements and features substantially the same as those described above with reference to FIG. 3 will not be described below.

Referring to FIG. 7, an interface board 200 of the jetting driver 10 includes an image controller 210, a voltage controller 220, a heater controller 230, and a plurality of differential line transmitters.

In particular, the voltage controller 220 further includes an amplifier 222 for generating a voltage for driving nozzles installed in heads H1 through H8. The voltage controller 220 may determine whether to use the amplifier 222 based on the type of the heads H1 through H8.

For example, each of the heads H1 through H8 may be of a drive per head (DPH) type including an amplifier 340 (see FIG. 4). The DPH type heads H1 through H8 are controlled by the jetting driver 10 on a head-by-head basis, not on a nozzle-by-nozzle basis. In this case, the amplifier 222 of the voltage controller 220 is not used. Even if the voltage controller 220 provides only a voltage control signal VCS and image data SD, a control voltage generator 330 of each of the heads H1 through H8 may provide a control voltage of a preset voltage level to piezo elements P1 through Pn.

Alternatively, each of the heads H1 through H8 may be of a drive per nozzle (DPN) type not including an amplifier. The DPN type heads H1 through H8 are controlled by the jetting driver 10 on a nozzle-by-nozzle basis. In this case, the amplifier 222 of the voltage controller 220 is used. The voltage controller 220 must provide not only the voltage control signal VCS and the image data SD but also a voltage to control the piezo elements P1 through Pn having present voltage level to the heads H1 through H8.

The jetting driver 10 according to some embodiments of the present disclosure includes an image board 100 and the interface board 200 physically separated from each other. Even if the heads H1 through H8 to be used are changed/replaced, an FPGA 120 (see FIG. 2) of the image board 100 can be reprogrammed and used.

In addition, even if, for example, the DPH type heads H1 through H8 are replaced with the DPN type heads H1 through H8, it is possible to use the interface board 200 by changing only the setting of the interface board 200 without changing the interface board 200. That is, one interface board 200 can be applied to both the DPH type heads H1 through H8 and the DPN type heads H1 through H8.

Figure 8:
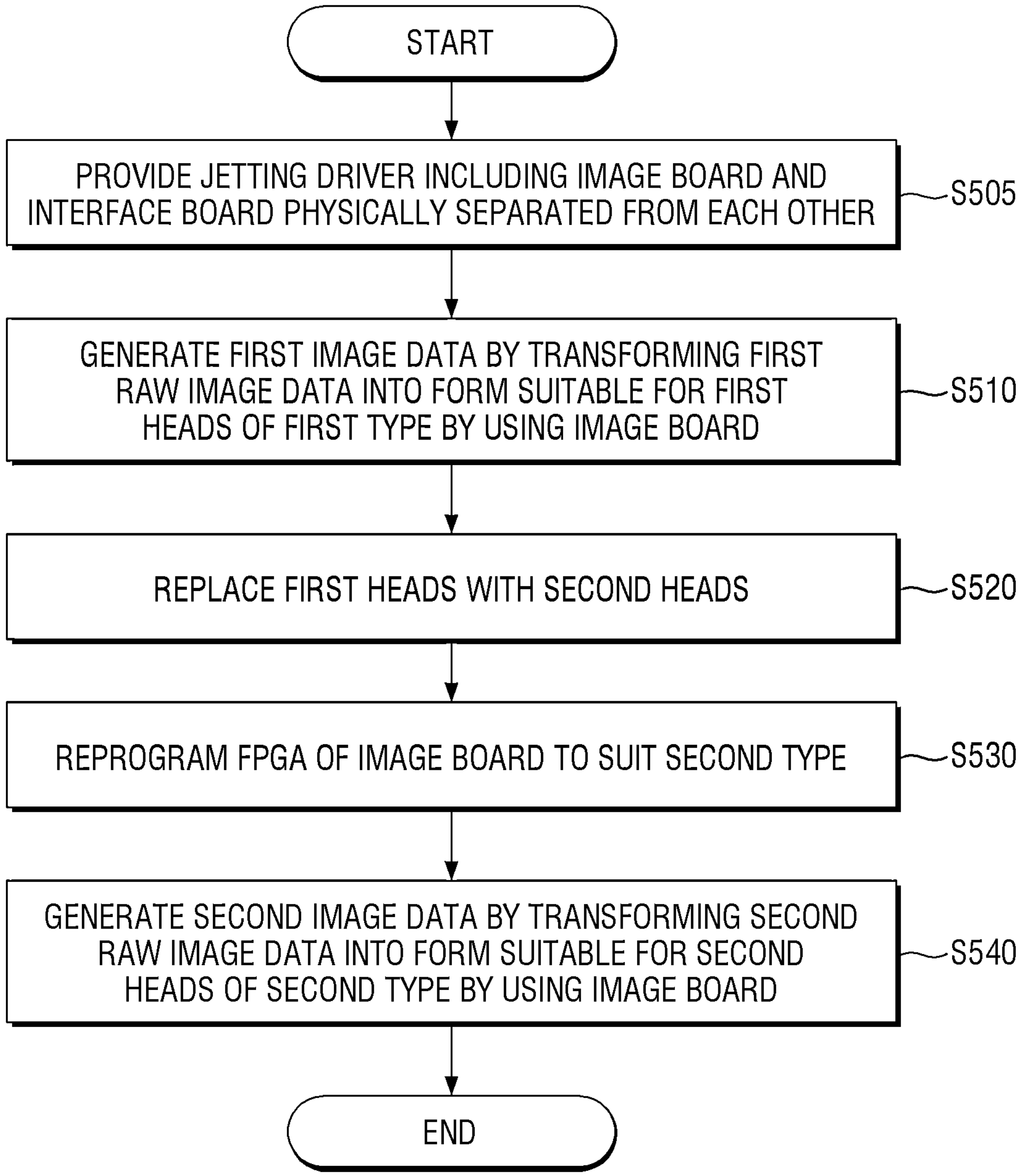
FIG. 8 is a flowchart illustrating a substrate treatment method according to embodiments of the present disclosure.

FIG. 8 is a flowchart illustrating a substrate treatment method according to embodiments of the present disclosure.

Referring to FIG. 8, a jetting driver 10 described with reference to FIGS. 1 through 6 is provided (operation S505). That is, the jetting driver 10 may include an image board 100 and an interface board 200 physically separated from each other, and the image board 100 may include an FPGA 120.

Next, first heads of a first type are controlled using the pre-installed jetting driver 10 (operation S510). Specifically, the image board 100 receives first raw image data and generates first image data by transforming the first raw image data into a form suitable for the first heads of the first type. The interface board 200 receives the first image data and transmits the first image data ID to the first heads through a plurality of channels.

Next, the first heads of the first type are replaced with second heads (H1 through H8) of a second type for reasons such as the type of a chemical and precision (operation S520). The first type and the second type are different types. For example, the first type may be a DPH type, and the second type may be a DPN type.

Next, the FPGA 120 of the image board 100 is reprogrammed to suit the second type (operation S530). Additionally, settings of the interface board 200 may be changed. For example, whether to use an amplifier 222 in a voltage controller 220 of the interface board 200 may be changed. Alternatively, the interface board 200 may be replaced with an interface board suitable for the second type.

Next, the second heads of the second type are controlled using the reprogrammed jetting driver 10 (operation S540). Specifically, the image board 100 receives second raw image data and generates second image data by transforming the second raw image data into a form suitable for the second heads of the second type. In addition, the interface board 200 receives the second image data and transmits the second image data to the second heads through a plurality of channels.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A jetting driver comprising:

an image board receiving raw image data and generating image data by transforming the raw image data into a form suitable for a type of heads used; and an interface board physically separated from the image board, receiving the image data, and transmitting the image data to the heads through a plurality of channels.

2. The jetting driver of claim 1, wherein the image board comprises a field programmable gate array (FPGA), and the FPGA is reprogrammed according to the type of the heads used.

3. The jetting driver of claim 1, wherein the interface board further comprises a plurality of differential line transmitters to communicate with the heads.

4. The jetting driver of claim 3, wherein the image data is transmitted in the form of differential signals through the differential line transmitters.

5. The jetting driver of claim 1, wherein the interface board further comprises a heater controller, and the heat controller controls a heater installed in each of the heads so that the heads can reach a target temperature.

6. The jetting driver of claim 1, wherein the interface board further comprises a voltage controller, and the voltage controller specifies a plurality of voltage levels to be used by the heads.

7. The jetting driver of claim 1, wherein the interface board further comprises a voltage controller, the voltage controller further comprises an amplifier for generating a voltage for driving nozzles installed in the heads, and whether to use the amplifier is determined based on the type of the heads.

8. The jetting driver of claim 7, wherein the amplifier is used when the heads are of a drive per nozzle (DPN) type and is not used when the heads are of a drive per head (DPH) type.

9. The jetting driver of claim 1, wherein the image board is connected to an operating computer through EtherCAT and provides the state of the jetting driver to the operating computer so that the operating computer can monitor the jetting driver.

10. The jetting driver of claim 1, wherein the image board and the interface board are connected by a board-to-board connector.

11. A substrate treatment apparatus comprising:
- a pattern computer providing raw image data and setting data; and
- a jetting driver controlling a plurality of heads based on the raw image data and the setting data,
- wherein the jetting driver comprises an image board and an interface board physically separated from each other,
- wherein the image board comprises an FPGA generating image data by transforming the raw image data into a form suitable for a type of the heads used,
- wherein the interface board comprises:
- a plurality of differential line transmitters for communicating with the heads;
- an image controller receiving the image data and providing the image data to the differential line transmitters;
- a heater controller providing a heater control signal for controlling a heater installed in each of the heads to the differential line transmitters; and
- a voltage controller providing a voltage control signal for specifying a voltage level to be used by the heads to the differential line transmitters.

12. The apparatus of claim 11, wherein the image board is connected to an operating computer through EtherCAT and provides the state of the jetting driver to the operating computer so that the operating computer can monitor the jetting driver.

13. The apparatus of claim 11, wherein the image board and the interface board are connected by a board-to-board connector.

14. The apparatus of claim 11, wherein the voltage controller further comprises an amplifier for generating a voltage for driving nozzles installed in the heads, and whether to use the amplifier is determined based on the type of the heads.

15. The apparatus of claim 14, wherein the amplifier is used when the heads are of a DPN type and is not used when the heads are of a DPH type.

16. A substrate treatment method comprising:
- providing a jetting driver comprising an image board and an interface board physically separated from each other, wherein the image board comprises an FPGA;
- receiving first raw image data and generating first image data by transforming the first raw image data into a form suitable for a plurality of first heads of a first type by using the image board and receiving the first image data and transmitting the first image data to the first heads through a plurality of channels;
- replacing the first heads with a plurality of second heads of a second type different from the first type;
- reprogramming the FPGA of the image board to suit the second type; and
- receiving second raw image data and generating second image data by transforming the second raw image data into a form suitable for the second heads of the second type by using the image board and receiving the second image data and transmitting the second image data to the second heads through a plurality of channels by using the interface board.

17. The method of claim 16, wherein the image board and the interface board are connected by a board-to-board connector.

18. The method of claim 16, wherein the interface board further comprises a voltage controller, the voltage controller further comprises an amplifier for generating a voltage for driving nozzles installed in the heads, and whether to use the amplifier is determined based on the type of the heads.

19. The method of claim 18, wherein the amplifier is used when the heads are of a DPN type and is not used when the heads are of a DPH type.

* * * * *